United States Patent [19]

Kamekawa et al.

[11] 4,227,898
[45] Oct. 14, 1980

[54] AIR CLEANER

[75] Inventors: Kunio Kamekawa, Hamamatsu; Sumio Yagi, Iwata, both of Japan

[73] Assignee: Yamaha Hatsudoki Kabushiki Kaisha, Iwata, Japan

[21] Appl. No.: 4,930

[22] Filed: Jan. 19, 1979

[30] Foreign Application Priority Data

Jan. 31, 1978 [JP] Japan .................................. 53/9991

[51] Int. Cl.² ............................................ B01D 50/00
[52] U.S. Cl. ....................................... 55/276; 55/337; 55/419; 181/279
[58] Field of Search ................. 55/276, 321, 325, 330, 55/333, 337, 419; 181/229, 279, 280

[56] References Cited

U.S. PATENT DOCUMENTS

| | | | |
|---|---|---|---|
| 1,127,896 | 2/1915 | Keller | 55/325 |
| 2,483,690 | 10/1949 | Carlson | 55/419 |
| 2,705,546 | 4/1955 | Chaffey | 55/276 |
| 3,853,518 | 12/1974 | Tu et al. | 55/337 |
| 3,898,064 | 8/1975 | Tao et al. | 55/276 |

FOREIGN PATENT DOCUMENTS

| | | | |
|---|---|---|---|
| 55753 | 9/1952 | France | 55/325 |
| 38-14603 | 8/1963 | Japan . | |
| 48-39443 | 11/1973 | Japan . | |
| 348692 | 5/1931 | United Kingdom | 181/66 |

Primary Examiner—David L. Lacey
Attorney, Agent, or Firm—Donald D. Mon

[57] ABSTRACT

An air cleaner to remove particulate matter from an air stream, and to dampen sounds emitted to the air cleaner by an internal combustion engine receiving air from the air cleaner. Such sounds are commonly conducted upstream through conventional air cleaners and are heard emitting from the inlet of the air cleaner. The air cleaner of this invention both effectively cleans the air and diminishes said sounds. The air cleaner has a partition dividing its interior into a unit chamber holding a filter element unit, and a passage chamber receiving air to be cleaned and conveying it to an opening in the partition leading to the unit chamber. The shape and location of the passage chamber assist in the reduction of sound transmitted upstream.

4 Claims, 6 Drawing Figures 4,227,898

AIR CLEANER

FIELD OF THE INVENTION

This invention relates to air cleaners, especially for internal combustion engines.

BACKGROUND OF THE INVENTION

The invention relates more particularly to an air cleaner in which a cylindrical filter element unit is contained in a cylindrical casing body, which element unit has its inner passage connected to a passage cylinder from which cleaned air is introduced to the carbureter.

The present invention has for its object to provide an air cleaner with a soundproof structure in which a passage chamber communicates with air inlets and with a unit chamber containing said filter element unit.

BRIEF DESCRIPTION OF THE INVENTION

A feature of the present invention resides in an air cleaner comprising a cylindrical casing body having its interior divided by a partition into a unit chamber and a passage chamber, a cylindrical filter element unit contained in the unit chamber and having an inner passage to receive cleaned air, a passage cylinder extending from the casing body and connected to said inner passage of the filter element unit. The passage chamber has air inlets in its wall through which ambient air is introduced into the passage chamber. The partition is formed with an air intake opening which communicates the passage chamber with the unit chamber. The end plate of the element unit or another member may be used as the partition dividing the casing body interior into the unit chamber and the passage chamber.

The passage cylinder communicating with the inner passage of the element unit may be projected directly from the wall of the unit chamber to the exterior of the casing body, or projected through the partition and the passage chamber to the exterior of the casing body. The latter arrangment is more desirable for soundproofing since the passage extending from the air inlets to the intake opening can readily have a long length. That is, the length of the passage extending from the air inlets to the intake opening can be increased by an arrangement in which the passage cylinder is connected coaxially to the inner passage of the element unit and projected from the upper wall of the passage chamber. Also, a vertical partition extending from one end of the passage cylinder to the chamber's inner peripheral wall is provided so as to form, in the passage chamber, a substantially annular-shaped passage around the outer peripheral of the passage cylinder such that the inlet opening is positioned at one end of the resulting arcuate passage, and the intake opening is positioned at the other end thereof.

The length of the passage extending from the air inlets to the intake opening can be further increased by an arrangement in which another partition is provided horizontally in the passage chamber to divide its interior into upper and lower passages. The intake opening is positioned in one end of the upper passage, a through-hole is formed in the other end thereof to communicate the upper passage with the lower passage, and the air inlets are positioned in the vicinity of the end portion furthest from the through-hole.

BRIEF DESCRIPTION OF THE DRAWINGS

The above and other features of this invention will be fully appreciated from the following description and the accompanying drawings, in which.

DESCRIPTION OF THE PREFERRED EMBODIMENT

Figure 1:
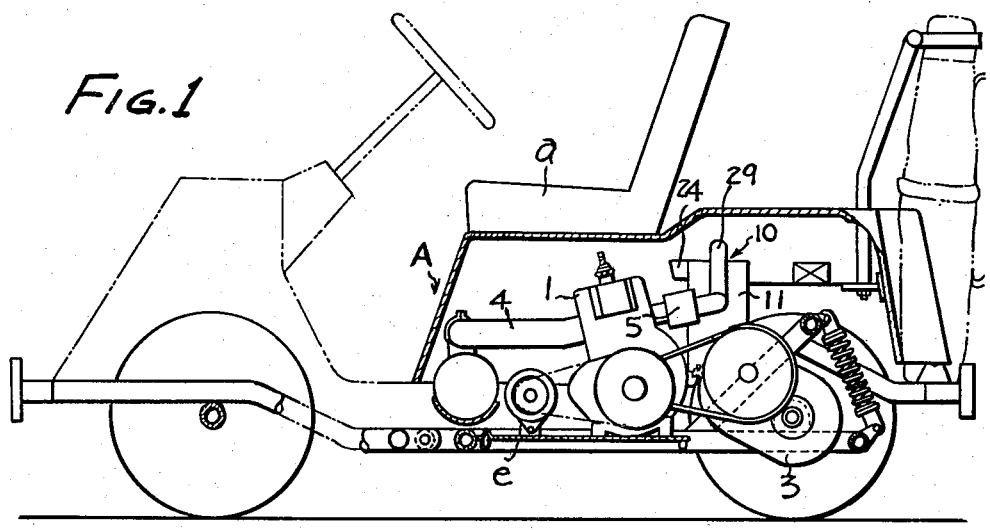
FIG. 1 is a side view of a golf car utilizing with its engine an air cleaner according to this invention.
Figure 2:
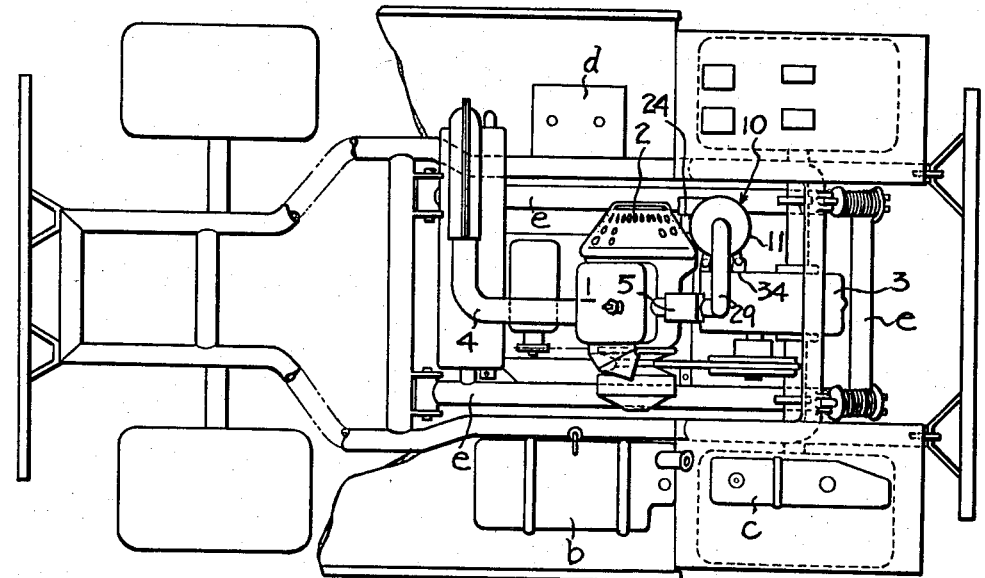
FIG. 2 is a top view of FIG. 1.

The air cleaner of the present invention is intended for use in a vehicle such as golf car, a leisure land car, or the like. FIGS. 1 and 2 show a golf car A including a seat a, a fuel tank b, an oil tank C, a battery d, and a swing arm e. The swing arm carries thereon an engine 1, a case 2, a differential gear 3, an exhaust pipe 4, a carbureter 5, and an air cleaner 10.

Figure 3:
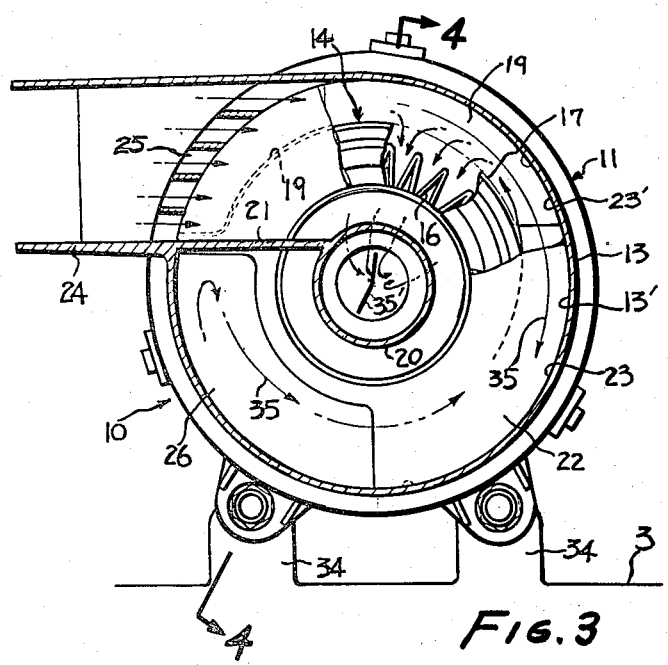
FIG. 3 is a cross-section, partially in cutaway cross-section of, an air cleaner according to the invention.
Figure 5:
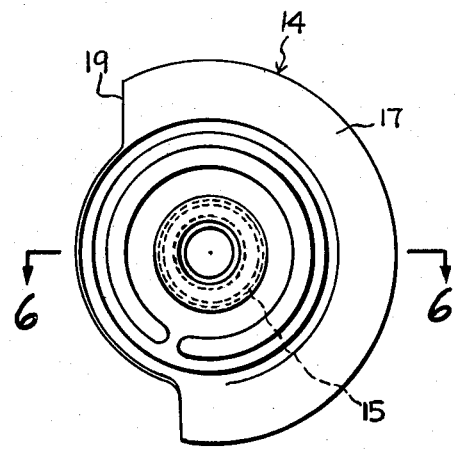
FIG. 5 is a plan view of a part used in cleaner of FIG. 3.
Figure 4:
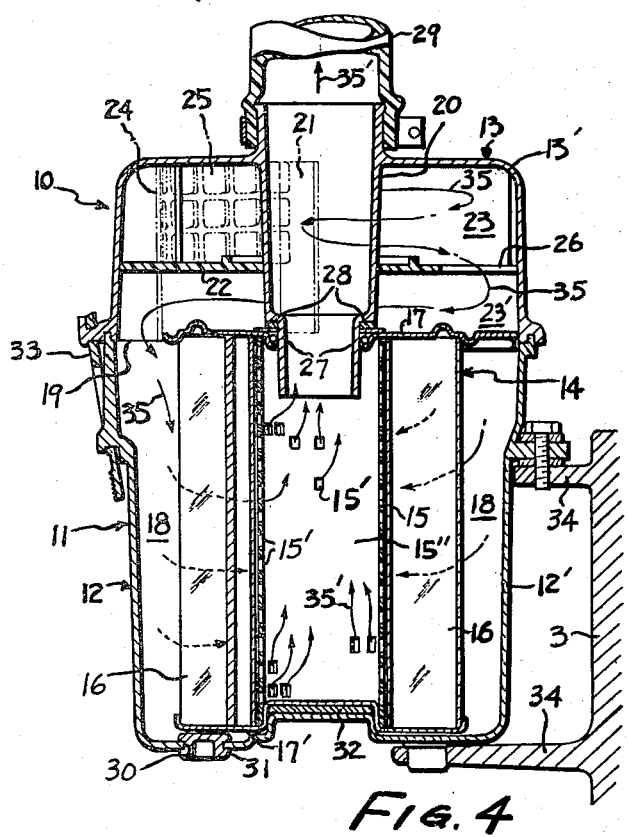
FIG. 4 is a cross-section taken at line 4—4 in FIG. 3.
Figure 6:
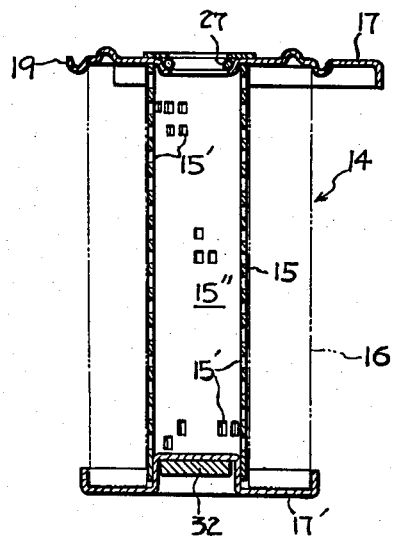
FIG. 6 is an axial cross-section of a filter element unit used in FIG. 3.

The air cleaner 10 (FIG. 3) comprises a casing body 11 composed of a lower casing 12 containing therein a filter element unit 14, and an upper casing 13 defining a passage chamber 13'. The lower and upper casings 12 and 13 are formed of synthetic resin. The lower casing 12 has a cylindrical shape with a bottom plate, and its depth is substantially equal to the height of the filter element unit 14. The upper casing 13 has a cylindrical shape with a top plate, and its depth is slightly shorter than that of the lower casing 12. The upper casing 13 is detachably held to the lower casing 12 by a rubber band 33. The casing body 11 is attached to the casing of the differential gear so that the lower casing 12 is connected to stays 34 extending from the casing of the differential gear 3.

The filter element unit 14 is comprised of a center pipe 15 with its periphery pierced by a number of small holes 15', a filter element 16 wound around the outer periphery of the center pipe 15, and metal end plates 17 and 17' supporting the upper and lower ends of the element 16 under compression. The filter element unit 14 is contained in the unit chamber 12' such that the center pipe 15 and the lower casing 12 are coaxially therein and an annular peripheral passage 18 is formed between the element 16 and the inside wall of the lower casing 12. The element unit 14 has an inner passage 15" defined by the center bore of the center pipe 15.

The upper end plate 17 bearing against the upper end surface of the filter element 16 includes an outer annular portion having its outer periphery placed in close contact with the lower end inner surface of the upper casing 13. The upper end plate 17 serves as a partition dividing the interior of the casing body 11 into the unit chamber 12' and the passage chamber 13'. The upper end plate 17 is formed to leave an open arcuate area so as to form with the casing an arc shaped intake opening 19 facing the peripheral passsage 18 for communicating the passage chamber 13' with the unit chamber 12'.

A passage cylinder 20 is integrally formed with the upper casing 13 such that it extends centrally through the upper casing 13. An annular passage is formed extending arcuately around its outer periphery. A vertically extending partition 21 is attached to the passage cylinder 20 so as to divide the annular passage. A horizontal partition 22 formed of rubber or synthetic resin is fitted around the passage cylinder 20 and the partition 21 to divide the interior of the upper casing 13 so that upper and lower arc-shaped passages 23 and 23′ are formed in the passage chamber 13′.

The lower end of the passage cylinder 20 extends downwardly below the lower end of the upper casing 13. The lower end of the passage cylinder 20 extends through the upper end plate 17 and a seal member 27 into the inner passage 15″. The passage cylinder 20 comes into resilient pressure contact with filter element unit 14 through a cushion 28 interposed between the passage cylinder 20 and the upper end plate 17 when the upper casing 13 is attached to the lower casing 12.

A deflecting cylinder 24 extends from the peripheral wall of the upper casing 13 in the vicinity of the vertical partition 21. The peripheral wall of upper casing 13 within the deflecting cylinder 24 is formed with a number of rectangular holes acting as air inlets 25. The air inlets 25 open to one end of the arc-shaped upper passage 23 formed in the passage chamber 13′, or in the vicinity of one side of the partition 21, and the deflecting cylinder 24 and the air inlets 25 are directed such that fresh air introduced into the upper passage 23 flows along the upper passage 23. The upper passage 23 is communicated with one end of the lower passage 23′ through a through-hole 26 formed in the partition 22 in the vicinity of the side opposite to the air inlet side. The intake opening 19 is positioned at the other end of the lower passage, or in the vicinity of the air inlets 25 on the other side of the partition 22 therefrom, so that the lower passage 23 is communicated through the intake opening 19 with the peripheral passage 18 of the unit chamber 12′.

The positions of the air inlets 25, through-hole 26, and the intake opening 19 are selected so as to maximize the length of the passage extending from the air intake opening 19, and through lower passage 23, through hole 26, and upper passage 23 to the air inlets 25.

The air cleaner 10 is installed on the golf car A so that the deflecting cylinder 24 is directed forward and acts as an air scoop. The cleaned air is discharged from the air cleaner through a hose 29 to the carbureter 5. In the figures the reference numeral 30 denotes a removable closure for opening and closing a dust discharge opening 31 provided in the bottom of the casing body 11, and the numeral 32 denotes a pad.

In operation, ambient air introduced by the deflecting cylinder 24 flows through the air inlets 25 into the passage chamber 13′ of the casing body 11. The introduced air 35 flows through the upper passage 23, the throughhole 26, and the lower passage 23′ and thence through the air intake opening 19 into the peripheral passage 18 of the unit chamber 12′. The air is cleaned while it flows through the filter element 16. The cleaned air 35′ flows through the small holes 15′ of the center pipe 15 into the inner passage 15″ flows through the passage cylinder 20 and the hose 29 into the carburetor 5.

The engine generates sounds which tend to flow upstream through the incoming air. They are generated by means such as piston skirt action and the opening and closing of valves. In this invention, the transmitted sounds are absorbed or otherwise attenuated while they are being transmitted upstream through the intake opening 19, the lower passage 23′, the through-hole 26, and the upper passage 23. This occurs because of the soundabsorbing function of the passage arrangement so as to prevent or reduce emission of sound through the intake opening 19.

As described above, in accordance with the present invention, a passage chamber is interposed between the filter unit chamber (which contains the filter element 16) and air inlets through which fresh air is introduced into the body with a passage chamber having sound absorbing function provided between the air inlets and the unit chamber. Thus, the noise created in the unit chamber and the intake passage extending from the unit chamber and the engine can be absorbed while it is transmitted through the passage chamber and cannot be emitted from the air cleaner. Also, since the passage chamber is positioned near the air inlets, the noises in the air cleaner can be effectively absorbed. Therefore, it is apparent that there has been provided, in accordance with the present invention, an air cleaner with a soundproof structure.

This invention is not to be limited by the embodiment shown in the drawings and described in the description, which is given by way of example and not of limitation, but only in accordance with the scope of the appended claims.

We claim:

1. An air cleaner comprising:
    a hollow cylindrical casing body having an axis and an air inlet through its wall;
    a lateral partition dividing the interior of the casing body into a passage chamber and a filter unit chamber, said lateral partition having an air intake opening passage therethrough and forming a limited intercommunication between said two chambers, and said air inlet opening into said passage chamber;
    a cylindrical air filter element positioned in said filter unit chamber so as to provide an annular peripheral passage between it and the casing which is in communication with said air intake opening, said air filter element having a central cleaned air outlet, said chamber being axially aligned; and
    a passage cylinder extending from outside the casing body and connected to the cleaned air outlet of the filter element;
    a second lateral partition dividing said passage chamber into an upper and a lower passage, said air inlet entering said upper passage;
    an axial partition adjacent to one side of said air inlet and dividing said upper passage, said second lateral partition having a throughhole between said upper and lower passage and positioned adjacent to the axial partition on the other side thereof from the air inlet, and said air intake opening in the first partition lying substantially axially aligned with said air inlet, entering said upper passage.

2. An air cleaner according to claim 1 in which said passage cylinder is coaxial with said filter element.

3. An air cleaner according to claim 2 in which said casing body is formed in two vertically aligned body parts, said filter unit chamber being formed in a lower one of said parts, said passages in an upper one of said parts, said passage cylinder being formed integrally with said upper part.

4. An air cleaner according to claim 3 in which said first mentioned lateral partition also constitutes an upper end plate for the filter element.

* * * * *